Patented Feb. 22, 1927.

1,618,249

UNITED STATES PATENT OFFICE.

SAMUEL FORMAN WALTON, OF ROSE VALLEY, PENNSYLVANIA.

FUEL BRIQUETTE AND ITS MANUFACTURE.

No Drawing. Application filed December 3, 1925. Serial No. 73,056.

My invention relates to fuel briquettes and their manufacture. It is especially adapted and advantageous for briquetting anthracite coal, though also adaptable to bituminous coal, coke, and the like.

In practicing my invention with anthracite, I preferably use screenings and dust as the base for my briquettes. These screenings I pulverize by crushing or grinding, until all the material will pass through a screen of sixteen meshes to the linear inch, or even finer. I desire a percentage of fines or dust with the coarse particles, in order that the voids may be lower than if the particles were all of one size, or all very fine. The coal should be crushed or ground dry.

As a bond, I prefer an organic material which will dry so as to hold the particles firmly together,—without necessity for carbonization or other chemical treatment,—and will not be affected by moisture or disintegrated by high heat. This facilitates and cheapens manufacture, and renders the briquettes stable and resistant to breakage in handling; when burned, moreover, they hold their shape until thoroughly consumed, as ordinary lumps of anthracite do. When rendered non-hygroscopic or waterproof, sulphite liquor such as glutrine (which carries about 50% moisture) answers my purpose very satisfactorily. This can be rendered waterproof by admixture therewith of cellulose in soluble form (cellulose solution, in other words), such as the waste from the manufacture of cellulose lacquers. The proportion of cellulose solution to sulphite liquor will vary according to the proportions of cellulose and solvent: For ordinary lacquer waste (containing 4 oz. cellulose to a gallon of solvent), I use one part of cellulose solution to two parts of sulphite liquor such as described above. These two organic components (sulphite liquor and cellulose solution) may be mixed and blended together in any machine that will not lose (through evaporation, too large a percentage of the volatile solvent in which the cellulose is dissolved (usually acetone or methyl acetate).

Thus prepared, the binder is added to the pulverized coal and thoroughly mixed and blended with it; then the mixture is briquetted in any suitable machine,—the roll type or the press and mold type being desirable. Unusually heavy pressure is not required. The proportion of binder to coal will vary somewhat with the fineness of the coal; but usually I find from one part binder and eleven of coal to one part binder and fourteen of coal to be satisfactory.

The pressed briquettes are next "baked" or dried to get rid of the moisture and the solvent of the cellulose. The temperature need not be high, not over 300–350° F.; moreover, a lower temperature with a greater quantity of air will answer as well as a high temperature. The drying is not completed, nor the briquettes fully "cured," until all the moisture and solvent are expelled.

Briquettes produced as described are hard, dense, coherent and stable against disintegration, and practically waterproof. They resist breakage in handling. They burn without disintegration, holding their shape until consumed. The bond is entirely organic, and does not introduce or produce ash; also, it burns without odor or smoke.

In the binder, the cellulose apparently forms a physical union with the sulphite liquor; when used as described, at any rate, it protects the briquettes from the effects of water or moisture until they are generally carbonized by combustion in use. Unless carbonized or otherwise chemically treated, sulphite liquor by iself would be unsatisfactory as a binder, because it is hygroscopic and absorbs moisture; so that after mere drying a briquette bonded with sulphite liquor alone would absorb moisture from the atmosphere and disintegrate. Cellulose used alone as a binder, on the other hand, would disintegrate in burning. A mixture of sulphite liquor and cellulose solution, however, is very highly satisfactory as a binder for anthracite, and can also be used for bituminous coal and coke, as I have already indicated.

While the materials and the procedure described above are those which I have generally found most advantageous, yet I have also found considerable variation therefrom to be practicable and consistent with the realization of various advantages of my invention. Thus soluble cellulose of various sorts (nitrated or unnitrated) can be used as a water-insoluble agent or varnish for waterproofing protection of the binder, instead of the lacquer waste mentioned: e. g., a solution of celluloid scrap can be used. Nor need the protective waterproofing agent (soluble cellulose of whatever sort) be mixed with the agglutinant or bond (sulphite liquor) in all cases,—although that is the course which I ordinarily prefer to follow. On the contrary, the briquettes may be pressed up and baked with a binder of sulphite liquor alone, and then waterproofed by coating them bodily and closing their pores with the cellulose solution. This can be done by immersing the baked briquettes in the solution and then allowing them to drain and dry a short time.

Having thus described my invention, I claim:

1. A stable, coherent fuel briquette, resistant to breakage and burning substantially without disintegration, comprising an uncarbonized water-soluble sulphid binding agent protected with a waterproof cellulosic agent.

2. A stable, coherent fuel briquette resistant to breakage and burning substantially without disintegration, comprising as its binding agent dried sulphite liquor, protected with an uncarbonized waterproof cellulose varnish.

3. A stable, coherent fuel briquette comprising a binding agent of dried but uncarbonized sulphite liquor, protected with a waterproof cellulose varnish.

4. A fuel briquette comprising as its binding agent sulphite liquor waterproofed with soluble cellulose.

5. A binder for fuel briquettes comprising sulphite liquor together with a soluble organic waterproofing agent.

6. A binder for fuel briquettes comprising sulphite liquor and soluble cellulose.

7. A process of making fuel briquettes which comprises combining powdered fuel and waterproofed glutrine, pressing the mixture to shape, and drying the shapes at a low temperature, substantially without carbonization.

8. A process of making fuel briquettes which comprises mixing together sulphite liquor and cellulose solution, combining them with powdered fuel, briquetting the product, and drying the briquettes at low temperature until substantially freed of moisture and solvent.

9. A binder for fuel briquettes consisting of one part of cellulose solution combined with two parts of sulphite liquor.

10. A fuel briquette consisting of pulverized coal with a binder in accordance with claim 9 substantially in the proportions of one part binder and from eleven to fourteen parts of the pulverized coal.

In testimony whereof, I have hereunto signed my name at Philadelphia, Pennsylvania, this 30th day of November, 1925.

SAMUEL FORMAN WALTON.